R. B. STIPES AND J. DE FRAIN.
HOLDDOWN APPLIANCE.
APPLICATION FILED MAR. 8, 1920.

1,346,387. Patented July 13, 1920.

Inventor
Reuben B. Stipes,
Joseph DeFrain,
By
Attorneys

UNITED STATES PATENT OFFICE.

REUBEN B. STIPES AND JOSEPH DE FRAIN, OF FLINT, MICHIGAN.

HOLDDOWN APPLIANCE.

1,346,387.  Specification of Letters Patent.  Patented July 13, 1920.

Application filed March 8, 1920. Serial No. 363,956.

*To all whom it may concern:*

Be it known that we, REUBEN B. STIPES and JOSEPH DE FRAIN, citizens of the United States of America, residing at Flint, in the county of Genesee and State of Michigan, have invented certain new and useful Improvements in Holddown Appliances, of which the following is a specification, reference being had therein to the accompanying drawings.

In the shipment of automobiles and similar vehicles it is the present practice to anchor wheels of an automobile relative to a car floor and for this purpose numerous devices have been devised. In some instances wood and metallic chock blocks are employed to prevent longitudinal movement of a wheel and to prevent vertical displacement, strips of canvas or other material have been arranged over the felly of a wheel and suitably connected to a car floor. With all of these devices, it has been possible for tires and wheels so anchored to become injured when a tire is deflated, there being a relatively loose movement of a wheel in its holding means which results in the chafing of a tire, rim cuts and other injuries.

The primary object of our invention is to provide a simple, durable and inexpensive device by which an automobile wheel may be positively anchored and supported relative to a car floor, the wheel being held from the hub portion thereof in contradistinction to the usual rim or peripheral fastening means employed for holding down or chocking the wheel. With our device the hub portion of a wheel is supported even though a tire should be deflated, and it is impossible for the tire to be injured or the automobile to shift due to tire deflation.

Our device may be easily and quickly installed, and after automobiles have been properly delivered it is possible to again use the wheel holding devices, as the same occupies a comparatively small space in return shipment.

Our invention will be hereinafter more fully considered and then claimed, and reference will now be had to the drawings, wherein Figure 1 is a side elevation of a flat bottom car with automobiles thereon and the wheels of the automobile held by holddown appliances in accordance with our invention;

Figure 1:
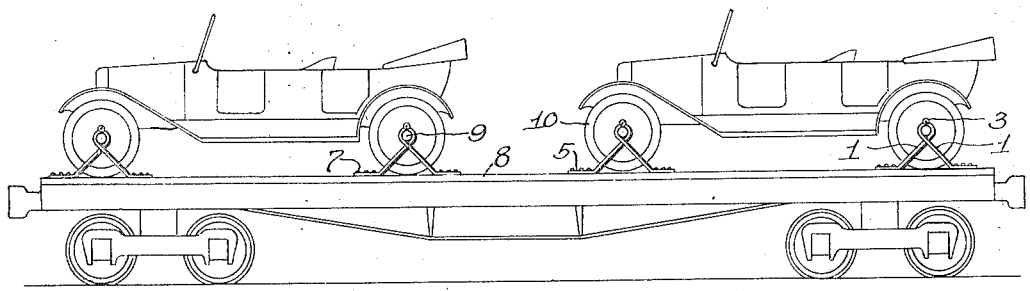

Each hold-down appliance comprises two diverging leg members 1 having hook-shaped upper ends 2 terminating in eyes 3 which are pivotally connected together by a rivet 4 or other pivotal means, so that the leg members 1 in crossing each other will form a loop portion at the connected hook-shaped ends of said members.

The lower ends of the leg members 1 are flattened to provide feet 5, and said feet are apertured, as at 6, so that screws 7, spikes or other fastening means may be employed for connecting the feet to a car floor 8.

Figures 2, 3:
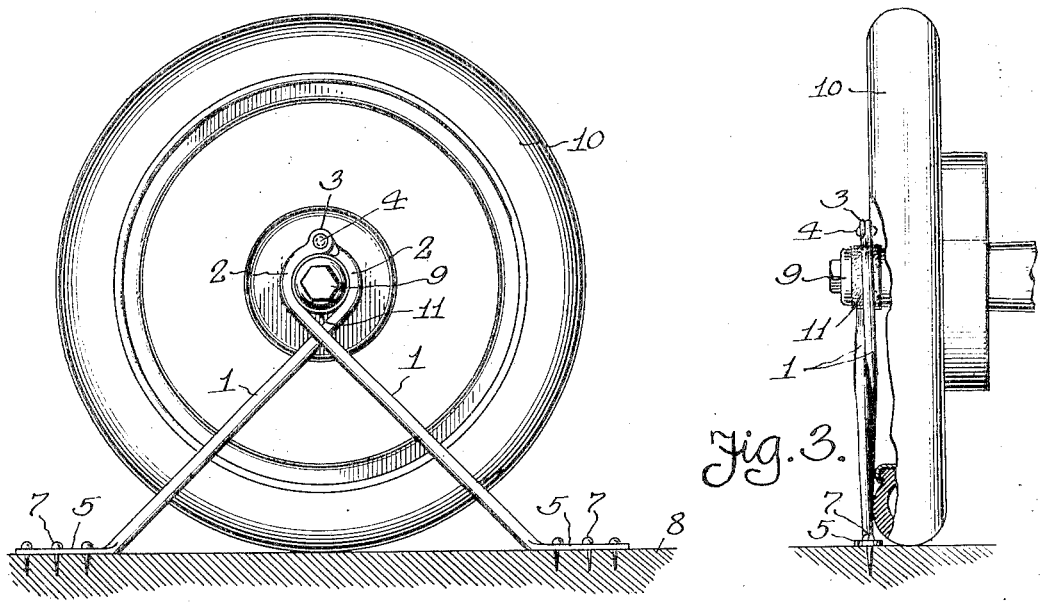
Fig. 2 is a side elevation of a wheel having its hub portion anchored by one of our appliances.
Fig. 3 is a front elevation of the same, partly broken away and partly in section.

Each appliance is preferably made of round stock and the diverging legs 1 sufficiently offset, adjacent the hook-shaped ends 2 thereof, so as to form a loop and yet permit of the feet 5 of the legs 1 remaining in longitudinal alinement upon the floor 8, as best brought out in Fig. 3 of the drawing.

With the loop of the appliance embracing the hub portion or cap 9 of a wheel 10 the wheel will be axially supported and may be positioned so that there are practically no stresses or strains on the tire of the wheel during transmission of the automobile. However, should the tire be deflated, it is impossible for rim cuts and other injury to happen to the wheel tire, when said wheel is supported by its hub and does not depend upon any tire clamping means, chock blocks or devices for engaging the periphery of a wheel.

Before placing the appliance in engagement with the hub portion of the wheel, a piece of canvas, felt or other material may be placed about the wheel hub, as indicated at 11, so that the metallic surfaces of our appliance will not injure or mar the finish of the wheel hub.

As shown in Fig. 1, it is possible to anchor the front and rear wheels of an automobile relative to a car floor, and when one end of an automobile is elevated above an adjacent automobile, as is sometimes the practice, it may be only necessary to use two of our appliances to maintain an automobile in place during shipment.

Figures 4, 5:
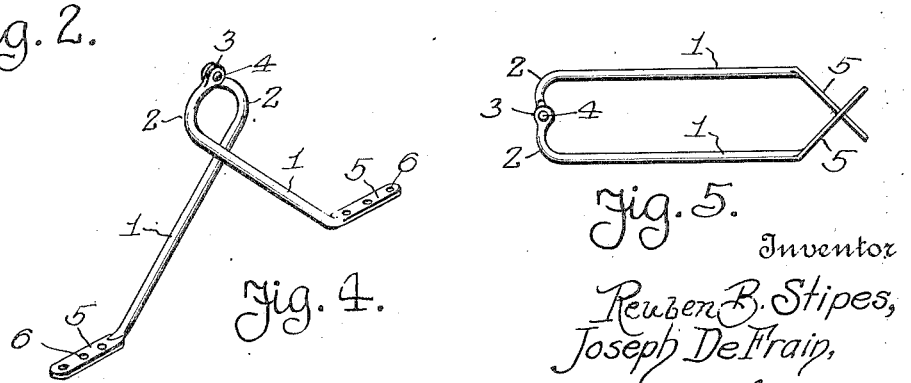
Fig. 4 is a perspective view of one of the holddown appliances.
Fig. 5 is a side elevation of one of the devices folded to a position by which it may be conveniently handled during return shipment.

As shown in Fig. 5 it is possible to swing the leg members 1 so as to provide substantially an oblong parcel and with the leg members so related, it is possible to nest a great many of the appliances for return shipment.

It is thought that the operation and utility of our hold-down appliance will be apparent without further description, and while in the drawing there is illustrated a preferred embodiment of our invention it is to be understood that the structural elements are susceptible to such variations and modifications as fall within the scope of the appended claims.

What we claim is:—

1. A hold-down appliance for automobiles comprising diverging leg members having hook-shaped ends pivotally connected together so as to form a loop when said leg members are crossed, and means adapted for fixing said leg members when crossed.

2. A hold-down appliance for automobiles, comprising leg members having the ends thereof pivotally connected together and shaped so as to embrace the hub portion of a wheel, and support said wheel independent of its tire, and feet on said members adapted to be anchored to hold said members against accidental displacement.

3. A hold-down appliance for automobiles, comprising connected members adapted to cross each other and in so doing embrace the hub portion of a wheel and support the hub portion and the wheel independent of its tire, and means for maintaining said members in a defined relation for supporting the wheel.

In testimony whereof we affix our signatures in presence of two witnesses.

REUBEN B. STIPES.
JOSEPH DE FRAIN.

Witnesses:
V. A. ROGERS,
HENRY H. HARTWELL.